Patented July 5, 1932

1,866,069

UNITED STATES PATENT OFFICE

FRANK WILCOXON, OF YONKERS, NEW YORK

COLLOIDAL METAL PRODUCTS AND PROCESS OF MAKING SAME

No Drawing.   Application filed December 17, 1926.   Serial No. 155,554.

This invention relates to finely divided products of metals and their compounds and to processes of making such products.

Various processes have been suggested in the prior art for the preparation of metal colloids, but these have generally involved the rather complex and expensive methods of production and the utilization of materials that have to a large extent precluded their very general use due to cost of manufacture, and to the lack of certain desirable or essential properties in the products.

Among the objects and advantages of the present invention is to be found the production of finely divided products and their processes of manufacture, that are simple and cheap in cost; that have highly desirable properties in the products; that utilize inexpensive materials during the course of manufacture; etc. For example in making such metal containing products as may be useful for insecticidal and fungicidal uses, the products of the present invention will be found to disperse readily in water or aqueous solutions; to remain in suspension for relatively extended periods; to adhere well to leaves of plants; to have relatively no injurious action to foliage; to possess high toxicity to fungi, etc.; and to be readily usable upon mere mixture with water or aqueous solutions.

Other and further objects and advantages of this invention will appear from the more detailed description set forth below, it being understood however that this more detailed description is given by way of illustration only, in accordance with the statutes, and not by way of limitation, since various changes in this disclosure may be made by those skilled in the art without departing from the scope and spirit thereof.

Fundamentally this invention teaches the utilization of industrial wastes and waste products for the reduction of metal compounds. As such waste products there may be mentioned waste molasses from sugar refineries both cane and beet sugar refineries, and waste cellulose liquors such as waste sulphite liquor. With the waste molasses products, any desirable temperatures may be used although temperatures below 100° C. are preferred and prove highly desirable. With waste cellulose liquors, temperatures below 100° C. are used.

Various metal compounds may be used either in solution or in precipitated condition in admixture with materials present during the treatments specified, depending on the solubility of the metal compounds undergoing treatment and the conditions thereof. The invention will be illustrated by examples utilizing copper compounds; but this is for purposes of explanation and illustration only, since other heavy metals may be treated in analogous ways to produce valuable products. The processes are desirably carried out in the presence of alkaline materials such as the caustic alkalies, for example sodium hydroxide.

The following examples will illustrate some of the features of the invention in their most desirable utilization.

I

One hundred parts of copper hydroxide in finely divided condition is intimately mixed with 50 parts of waste molasses such as the product known as "black strap". To this mixture there is added 50 parts of sodium hydroxide dissolved in 50 parts of water. Reaction generally begins without the application of external heat. A rapid reduction probably to the cuprous condition takes place. During the reaction the reacting ingredients are desirably brought into intimate contact, as by stirring or agitation in any well known manner. The resulting product is a yellow paste, containing the copper or copper compound in finely divided form.

Black cupric oxide may be used instead of copper hydroxide, in which case the resulting paste is red in color. In carrying out these and other processes herein specified, heat may be applied at atmospheric pressure, or the mixture may be heated under pressure, for example in a closed vessel, until the desired reduction of the copper or other metal is complete.

II

As an example of using a soluble metallic compound the following example using copper sulphate, sodium hydroxide, and waste molasses is given. 100 parts of copper sulphate is dissolved in 1000 parts of a solution containing from 30 to 50 parts waste molasses. 50 parts of sodium hydroxide in 50 parts of water is added desirably with stirring, and the solution heated to about 80° C. finely divided cuprous hydroxide separates and may be removed from the solution by filtration or centrifuging. This is desirable in order to remove the copper compound from the sodium sulphate formed during the reaction and which has a precipitating action on the finely divided copper.

III

The following example exemplifies the use of waste sulphite liquor. Copper sulphate is dissolved in the waste liquor of the sulphite paper pulp industry, an excess of sodium hydroxide added, and the resulting material is then heated to about 80° C. The solution may then be filtered to remove sodium sulphate, excess alkali, etc. The copper on the filter is in the form of a paste of finely divided hydrated cuprous oxide.

The proportions of the reactants in the above examples, given in parts by weight, may be varied widely from the amounts given without essentially changing the nature of the product. It is believed that the organic substances present in for example the waste molasses, act as protecting colloids, while the sugar reduces the copper in the presence of the alkali.

An essential feature of the invention is the utilization of such industrial waste products that are relatively inexpensive, and which exert both a reducing action and a protecting colloid function in the presence of the alkali. In the use of the term "waste material having reducing and colloid protecting properties" as used in the claims, it is intended to include waste molasses from sugar refineries, (both beet and cane sugar refineries) and also waste cellulose liquors such as waste sulphite liquor.

Having thus set forth my invention, I claim:

1. The process of producing finely divided metal products which comprises reducing a reducible heavy metal compound with waste molasses of sugar refineries in the presence of alkali until a finely divided metal product is obtained.

2. The process of producing readily dispersible metal products which comprises heating a reducible heavy metal compound and black strap in the presence of caustic alkali at a temperature below 100° C. until a finely divided metal product is obtained.

3. The process of producing finely divided copper products which comprises treating a copper compound and waste molasses in the presence of alkali until a finely divided metal product is obtained.

4. The process of producing finely divided copper products which comprises heating a soluble copper compound and waste molasses in the presence of sodium hydroxide at a temperature of approximately 80° C.

5. The process of producing readily dispersible copper products which comprises heating a copper oxide containing material with black strap in the presence of sodium hydroxide at a temperature below 100° C. until a finely divided copper product is obtained.

6. The process of producing finely divided metal products which comprises heating a reducible heavy metal compound and a waste material having reducing and colloid-protecting properties in the presence of alkali at a temperature below 100° C.

7. The process of producing readily dispersible metal products which comprises heating a reducible copper compound and a waste material having reducing and colloid-protecting properties in the presence of sodium hydroxide at a temperature of approximately 80° C.

8. A metal product produced by the process of claim 1.

9. A copper paste produced by the process of claim 3.

10. A metal product produced by the process of claim 6.

FRANK WILCOXON.